(12) United States Patent　　(10) Patent No.: US 11,240,388 B2
Silberberg et al.　　(45) Date of Patent: Feb. 1, 2022

(54) VISUALIZING IMAGE REGISTRATION INFORMATION

(71) Applicant: HEWLETT-PACKARD INDIGO B.V., Amstelveen (NL)

(72) Inventors: Motti-Mordechay Silberberg, Nes Ziona (IL); Yaron Hershman, Gedera (IL)

(73) Assignee: HP Indigo B.V., Amstelveen (NL)

( * ) Notice: Subject to any disclaimer, the term of this patent is extended or adjusted under 35 U.S.C. 154(b) by 483 days.

(21) Appl. No.: 15/514,121

(22) PCT Filed: Sep. 26, 2014

(86) PCT No.: PCT/EP2014/070655
§ 371 (c)(1),
(2) Date: Mar. 24, 2017

(87) PCT Pub. No.: WO2016/045743
PCT Pub. Date: Mar. 31, 2016

(65) Prior Publication Data
US 2017/0302810 A1　　Oct. 19, 2017

(51) Int. Cl.
*H04N 1/00*　　(2006.01)
*H04N 1/50*　　(2006.01)
*H04N 1/387*　　(2006.01)

(52) U.S. Cl.
CPC ....... *H04N 1/00456* (2013.01); *H04N 1/3872* (2013.01); *H04N 1/508* (2013.01); *H04N 2201/0082* (2013.01)

(58) Field of Classification Search
CPC ... G06F 3/1208; G06F 3/1256; H04N 1/0044; H04N 1/00456; H04N 1/3876; H04N 1/00508; H04N 1/58; H04N 1/62
See application file for complete search history.

(56) References Cited

U.S. PATENT DOCUMENTS

| | | |
|---|---|---|
| 6,198,549 B1 | 3/2001 | Decker et al. |
| 6,335,978 B1 | 1/2002 | Moscato et al. |
| 6,968,076 B1 | 11/2005 | OuYang et al. |
| 9,162,475 B1 * | 10/2015 | Wozniak ................. H04N 1/58 |
| 2002/0136579 A1 * | 9/2002 | Michel ................... B41J 11/008 400/74 |
| 2004/0125392 A1 | 7/2004 | Ohmori |
| 2008/0089704 A1 | 4/2008 | Jeon |

(Continued)

OTHER PUBLICATIONS

Constant Evolution of KHS-AI—the Integrated Control System for Enhanced Productivity and Print Quality; Komori America Corporation; Oct. 14-15, 2010; pp. 1-27; http://www.komori.com/contents_com/onpress/pdf/op71.pdf.

(Continued)

*Primary Examiner* — Juan M Guillermety
(74) *Attorney, Agent, or Firm* — Nathan R. Rieth (57) ABSTRACT

In an example implementation, a method of providing image registration information in a digital printing press includes imaging a printed page on an impression drum of a digital printing press, determining image registration information from printed content on the page, and displaying a graphical visualization of the image registration information on a user interface screen of the digital printing press.

15 Claims, 5 Drawing Sheets

(56) References Cited

U.S. PATENT DOCUMENTS

| | | | | |
|---|---|---|---|---|
| 2009/0165663 A1* | 7/2009 | Reid | ................ | B41J 29/393 |
| | | | | 101/425 |
| 2010/0046014 A1* | 2/2010 | Eun | ................ | H04N 1/58 |
| | | | | 358/1.9 |
| 2010/0047000 A1* | 2/2010 | Park | ................ | G03G 15/5062 |
| | | | | 399/394 |
| 2010/0309526 A1 | 12/2010 | Kulkarni et al. | | |
| 2011/0222106 A1* | 9/2011 | Grodsky | ................ | G03G 15/5062 |
| | | | | 358/1.15 |
| 2011/0255138 A1 | 10/2011 | Calamita | | |
| 2011/0304886 A1* | 12/2011 | Hoover | ................ | G03G 15/5062 |
| | | | | 358/1.18 |
| 2012/0070040 A1* | 3/2012 | Vans | ................ | H04N 1/00047 |
| | | | | 382/112 |
| 2013/0250369 A1* | 9/2013 | Kitai | ................ | H04N 1/00005 |
| | | | | 358/405 |
| 2013/0293923 A1* | 11/2013 | Fisher | ................ | G06F 3/121 |
| | | | | 358/1.15 |
| 2014/0043601 A1* | 2/2014 | Takahashi | ................ | G01B 11/26 |
| | | | | 356/138 |
| 2015/0054865 A1* | 2/2015 | Landa | ................ | G06F 3/1256 |
| | | | | 347/2 |
| 2015/0063889 A1* | 3/2015 | Kojima | ................ | G03G 15/36 |
| | | | | 399/394 |
| 2015/0116734 A1* | 4/2015 | Howard | ................ | G06K 9/6201 |
| | | | | 358/1.4 |
| 2015/0356717 A1* | 12/2015 | Madden | ................ | H04N 1/00042 |
| | | | | 358/1.6 |
| 2016/0105571 A1* | 4/2016 | Van Horssen | ................ | G06F 3/1208 |
| | | | | 358/1.15 |

OTHER PUBLICATIONS

Freear, N. et al; Automated Visual Inspection for the Quality Control of Pad Printing; (Dec. 2001) The University of Birmingham; pp. 1-220: http://etheses.bham.ac.uk/890/1/Freear02PhD.pdf.

PPrintee, the Mini Robot Printer That Drives Itself on Paper; Retrieved from the Internet on Jun. 1, 2017, https://www.indiegogo.com/projects/pprintee-the-mini-robot-printer-that-drives-itself-on-paper.

Videojet's CLARiSUITE Code Assurance Solutions Help Ensure That the Correct Code is Applied in the Correct Location on the Correct Product and Packaging; CLARiSUITE—Code Assurance Solutions/Videojet Technologies; Retrieved from the Internet on Aug. 21, 2014; http://www.videojet.com/us/homepage/products/clarisuite-software-products.html.

\* cited by examiner

VISUALIZING IMAGE REGISTRATION INFORMATION

CROSS-REFERENCE TO RELATED APPLICATION

This application is a U.S. National Stage Application of and claims priority to International Patent Application No. PCT/EP2014/070655, filed on Sep. 26, 2014, and entitled "VISUALIZING IMAGE REGISTRATION INFORMATION," which is hereby incorporated by reference in its entirety.

BACKGROUND

The printing industry continues to experience a transition from analog to digital equipment. In general, digital printing can be more economical for short print jobs due to reduced setup costs, while analog offset printing can be more economical for longer print jobs as the price per printed page diminishes with quantity. Thus, while digital printing methods can have a higher cost per page than analog offset printing methods, the higher cost can be offset by avoiding the labor-intensive steps involved in analog printing, such as preparing and replacing printing plates for each print job. Digital printing devices employ plateless printing technologies and provide the advantage of enabling "variable data printing" or "on-demand printing" that allows content to be changed from one printed page to the next. In addition, print quality from digital printing technologies continues to improve and is on par with analog offset printing. The benefits of variable data printing, improving image quality, and decreasing costs, have made digital printing a desirable choice over analog offset printing in many printing applications.

BRIEF DESCRIPTION OF THE DRAWINGS

The present embodiments will now be described, by way of example, with reference to the accompanying drawings, in which.

Throughout the drawings, identical reference numbers designate similar, but not necessarily identical, elements.

DETAILED DESCRIPTION

As noted above, digital printing technologies provide variable, economical, and high quality printing that is driving the transition away from analog offset printing. However, as the transition from analog to digital printing devices continues, differences in the design and functionality of the digital printing devices can create challenges for print operators. For example, basic information and tools that an operator is accustomed to using when managing an analog offset printing device may be different or even non-existent when using a digital printing device. Therefore, one challenge to overcome in the transition from analog to digital printing is that of maintaining a consistent operator/user experience that is both familiar to the operator and effective in providing the same or similar information and tools for managing the digital printing process as are available in the analog printing process. In a particular example, the packaging/paperboard printing industry continues to move to digital printing technologies such as large-format digital printing presses, due in part to shorter product life cycles, demand for faster time to market, and a decline in the average length of print job runs. While capabilities inherent to a digital printing press (e.g., variable data printing) can be better suited to manage such issues than analog printing equipment, performing certain functions on a digital press can be challenging to operators familiar with managing an analog press.

One such function is that of verifying image registration (i.e., image position or alignment on the page). Analog printing equipment provides a visual method of verifying image registration that is generally not available when printing on a digital press. For example, in the paperboard printing industry, it is common to print marks at the paper edges (e.g., paperboard edges) to provide a print operator with visual information that indicates whether any printed pages/sheets have image registration problems (i.e., images aligned improperly on the page). The marks on the paper edges allow the operator to observe a batch of printed pages from both sides and determine if the image position on the pages is stable. As pages are printed and stacked in an output stacker, the operator can view the pages through a window in the stacker and visually inspect the marks at the paper edges to determine if any marks are out of alignment. This is often called a front-to-front (FTF) test, because it determines whether images being printed on the front or top sides of multiple pages are being positioned consistently in the same location on the pages. When a mark at the edge of a page is not aligned with the marks on the other pages in the stack, the image on that page is not registered (i.e., aligned) properly on the page. The visual cue along the edges of pages allows the operator to physically remove pages with image registration errors from the printed stack, which helps to avoid some of the cost associated with subsequent finishing functions along the production line path.

Unlike analog printing equipment, a digital printing press cannot effectively print alignment/registration marks along the edges of the pages. Printing beyond the edges of the pages with a digital printing press will cause several problems including causing ink buildup on the print blanket (i.e., the image transfer medium) at the edges of the page. Ink build up on the blanket causes print quality issues when changing to different sized pages, and it damages the print blanket, which reduces the print blanket life span and results in an untimely and costly blanket replacement.

Accordingly, example methods and systems described herein enable image registration in a digital printing press by providing a visualization of measured image registration information. The visualization of measured image registration digital data provides feedback to a digital press operator that is similar to the feedback provided in analog printing equipment. Registration targets are printed on a page along with an image, and measurement tools on the digital printing press measure distances between the registration targets and edges of the page. The registration targets can be printed near the leading edge, the side edges, and the trailing edge of the page, and distance measurements can be made in both X and Y directions going away from the targets and toward the page edges. Analysis of the measurement data provides X and Y offset data that indicates the amount (i.e., distance) of misregistration present in the registration targets, and correspondingly, the amount of misregistration present in the printed image. The measured offset data is transformed into a visual form (e.g., a graphical or diagrammatic form) for display on a user interface screen of the digital printing press. The visualization of the image registration data on the user interface screen provides real-time feedback to the press operator, which allows the operator to know if the image registration on any of the printed pages is out of spec or otherwise beyond an acceptable registration threshold. The real-time image registration feedback provides advantages that include enabling press operators to make press adjustments to overcome registration errors, stop the printing process in order to remove disqualified or "out-of-spec" pages from an output stack, and so on. In addition to real-time feedback of image registration data, summarized statistics of image registration information can be provided during a print job, at the end of a print job, for previous jobs, and in various other user-configurable ways.

In one example implementation, a method of providing image registration information in a digital printing press includes imaging a printed page on an impression drum of a digital printing press, determining image registration information from printed content on the page, and displaying a graphical visualization of the image registration information on a user interface screen of the digital printing press.

In another example, a digital printing press includes a user interface screen, and an imaging device to image a printed page as the printed page travels on an impression drum of the printing press. The press also includes a measurement module to determine from the imaged page, registration information from target points on the printed page, and a visualization module to display the registration information in graphical form on the user interface screen.

In another example, a non-transitory machine-readable storage medium store instructions that when executed by a processor of a printing device, cause the printing device to print a print job image on a page, and print target registration points on the page. The instructions further cause the printing device to measure distances between edges of the page and the target registration points to determine image registration information. The image registration information is then displayed in a visualized graphical form on a user interface screen of the printing device in real-time.

Figure 1:
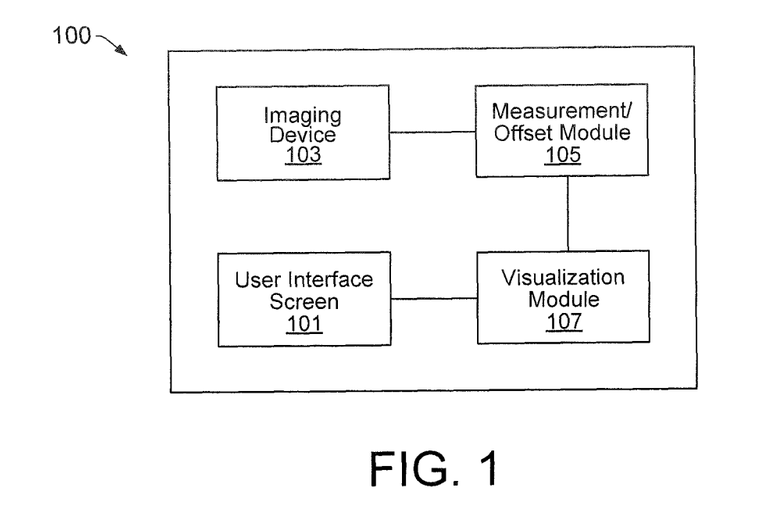
FIG. 1 shows an example of a system that enables image registration through the visualization of measured image registration information.
Figure 2:
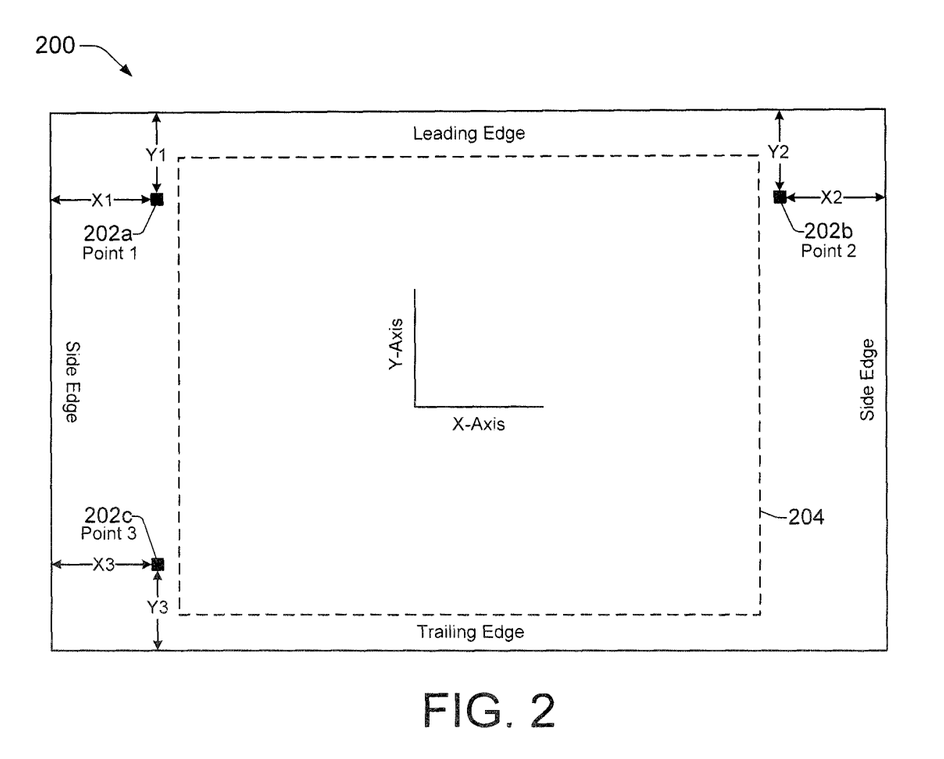
FIG. 2 shows an example of a printed page that has been imaged, or captured, by imaging device.

FIG. 1 conceptually illustrates an example of a system 100 that enables image registration through the visualization of measured image registration information. In some examples, as discussed below with reference to FIG. 5, system 100 can comprise a print-on-demand electrophotographic printing device, such as a liquid electrophotographic digital printing press. System 100 includes an imaging device 103 such as a camera to capture an image of a printed page as the printed page traverses a print media path within the system. FIG. 2 shows an example of a printed page 200 that has been imaged, or captured, by imaging device 103. Unless otherwise noted, the terms "imaged page", "imaged printed page", "printed page", "page", and so on, are used interchangeably throughout this description to generally refer to a printed page or an image of such a printed page, which are both generally represented by the illustration shown in FIG. 2. Thus, the printed page 200 of FIG. 2 is intended to represent both an actual printed page and an image of a printed page, and it can be alternately referred to as a printed page 200, an imaged page 200, an imaged printed page 200, and so on.

System 100 also includes a measurement/offset module 105 and a visualization module 107. In different examples, modules 105 and 107 can comprise hardware, programming instructions, or a combination of hardware and programming instructions designed to perform a particular function or combination of functions. Hardware incorporated into modules 105 and 107 can include, for example, a processor and a memory, while the programming instructions comprise code stored on the memory that is executable by the processor to perform the designated function or functions.

Referring generally to FIGS. 1 and 2, the measurement/offset module 105 operates to analyze the image of a printed page 200 that has been captured by imaging device 103, and to provide real-time image registration digital data based on measured registration target points. From the imaged page 200, the measurement/offset module 105 measures distances from the edges of the page 200 to one or multiple registration target points 202 (illustrated as target point 1 (202a), target point 2 (202b), and target point 3 (202c)) that have been printed on the page 200 along with a print job image 204. The target points 202 are typically, but not necessarily, printed outside of the print job image area 204 on page 200. As shown in FIG. 2, target points 202 can be located adjacent to the edges of the page 200, such as the leading edge, the side edges, and the trailing edge. Module 105 operates to calculate the centers of target points 202, and in different examples it can determine both X and Y distances from the page edges for each target point 202.

Depending on the type of calculation being made, module 105 can measure the Y distance of a target point 202, the X distance of a target point 202, or both. For example, module 105 can perform a front-to-front (FTF) registration calculation by measuring the Y distances of target points 202a and 202b and the X distances of target points 202b and 202c. In general, a FTF registration provides a comparison of the measured location of image 204 on the front surface of the page 200 with an expected, or specified, location. A FTF registration calculation includes finding a FTF_Y alignment and a FTF_X alignment for the target points 202 printed on one or multiple pages. Thus, as shown in FIG. 2, Y1 is the distance measured from target point 202a (e.g., the center of target point 202a) to the leading edge of the page 200, and Y2 is the distance measured from target point 202b (e.g., the center of target point 202b) to the leading edge of the page 200. A FTF_Y calculation determines the Y alignment of target points 202 on page 200, such as discussed below with regard to FIG. 3. The FTF_Y calculation can include building two series $S_{Y1}$ and $S_{Y2}$ based on Y1 and Y2 measurements (target points 202a and 202b) from a series of multiple pages printed by system 100 as follows:

$$S_{Y1} = \{(Y1_1), (Y1_2), \ldots, (Y1_n)\}$$

$$S_{Y2}=\{(Y2_1),(Y2_2),\ldots,(Y1_n)\}$$

where the subscripts 1 through n represent the number of pages printed. The range (R) of each series can then be calculated as follows:

$$R_{Y1}=\text{Max}(S_{Y1})-\text{Min}(S_{Y1})$$

$$R_{Y2}=\text{Max}(S_{Y2})-\text{Min}(S_{Y2})$$

The FTF_Y registration calculation can then be made as follows:

$$\text{FTF}\_Y=\text{Max}(R_{Y1},R_{Y2})$$

In a similar manner, the FTF_X calculation can include building two series $S_{X2}$ and $S_{X3}$ based on X2 and X3 measurements (target points 202b and 202c) from the series of multiple pages printed by system 100:

$$S_{X2}=\{(X2_1),(X2_2),\ldots,(X2_n)\}$$

$$S_{X3}=\{(X3_1),(X3_2),\ldots,(X3_n)\}$$

The range (R) of each series can then be calculated as follows:

$$R_{X2}=\text{Max}(S_{X2})-\text{Min}(S_{X2})$$

$$R_{X3}=\text{Max}(S_{X3})-\text{Min}(S_{X3})$$

The FTF_X registration calculation can then be made as follows:

$$\text{FTF}\_X=\text{Max}(R_{X2},R_{X3})$$

A calculation of the real-time position of registration target points can be made in order to provide real-time image registration digital data output as pages are being printed on a system 100, as follows:

$$\text{Image Registration Output}=\text{Max}((|X_{Theoretical}-X2_n|),(|X_{Theoretical}-X3_n|))$$

where $X_{Theoretical}$ is a known value.

Thus, the measurement/offset module 105 can perform a FTF registration calculation that generates real-time image registration digital data as the system 100 prints multiple pages.

Referring again to FIG. 1, the visualization module 107 can analyze the real-time image registration digital data measured from the measurement/offset module 105, including the FTF_Y and FTF_X data, and transform the registration data into a diagrammatic, or graphical, form. The diagrammatic or graphical form of the image registration data can then be displayed on the user interface screen 101 of the system 100.

Figure 3:
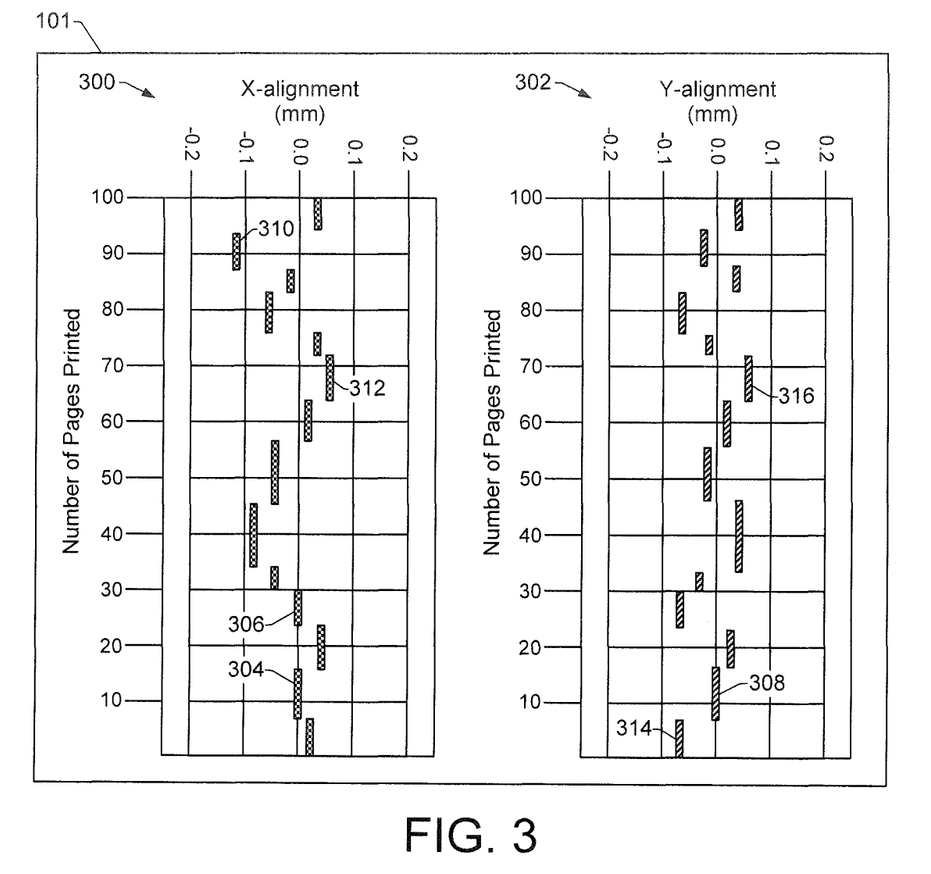
FIG. 3 shows an example visualization of FTF_X alignment data and FTF_Y alignment data measured for image registration target points from a group of printed pages.

FIG. 3 represents an example visualization of FTF_X alignment data 300 and FTF_Y alignment data 302 measured for image registration target points 202 from a group of printed pages 200. The FIG. 3 example provides a snapshot in real-time during a printing process that shows a visual (i.e., graphical, diagrammatic) representation of image registration data as it is measured from a group of 100 printed pages and displayed in real-time on the user interface screen 101 of the system 100. As the printing process continues, the number of printed pages and the corresponding visualized data will continue to increase beyond the 100 printed pages. It is noted that the graphical visualization of X and Y alignment data shown in FIG. 3 is only an example, and is not intended as a limitation as to how such image registration data may be transformed and visually displayed. Thus, any number of different ways of transforming and visualizing such image registration data are possible and are contemplated by this disclosure.

Referring still to the example in FIG. 3, printed pages that have a perfectly accurate target alignment (i.e., with no image registration error), will appear at 0.0 millimeters in both the X alignment and Y alignment visualizations. There is zero image registration offset for such pages. For example, the X alignment is accurate for pages 7 through 16 (reference number 304) and pages 24 through 30 (reference number 306), because these pages show no offset from 0.0 millimeters in the X direction. Likewise the Y alignment is accurate for pages 7 through 16 (reference number 308), because these pages show no offset from 0.0 millimeters in the Y direction.

However, it is also apparent from the visualization shown in FIG. 3, that there is misalignment, or misregistration, in the measured target data for many of the pages from the group of 100 printed pages. For example, the X alignment data for the group of 100 printed pages shows an X offset from an expected alignment (i.e., 0.0 millimeters) that ranges from approximately −0.12 millimeters (mm) for pages numbered 87 through 94 (reference number 310) to approximately 0.06 mm for pages numbered 64 through 72 (reference number 312). For the same group of 100 printed pages, the Y alignment data shows a Y offset from an expected alignment (i.e., 0.0 millimeters) that ranges from approximately −0.08 mm for pages numbered 0 through 7 (reference number 314) to approximately 0.07 mm for pages numbered 63 through 72 (reference number 316).

The real-time feedback from the visualization of the image registration data shown on the user interface screen 101 of system 100 allows an operator to monitor the status of the image registration and to quickly determine when the image registration begins to fall outside of an acceptable range. This enables the operator to take corrective action when appropriate to make system adjustments, remove pages whose image registrations fall outside a specified range, and so on.

Figure 4:
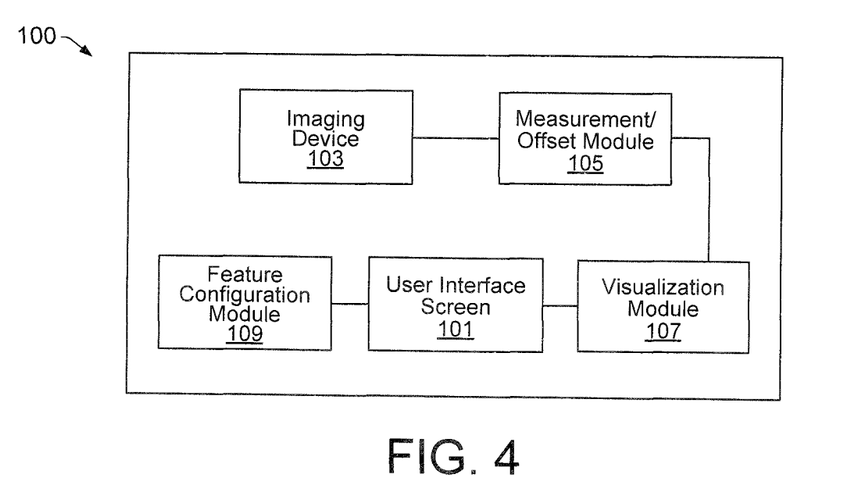
FIG. 4 shows another example a system that enables image registration through the visualization of measured image registration information, where the system includes a feature configuration module.

In some examples, the system 100 includes a feature configuration module 109, such as shown in FIG. 4, that enables an operator to control features of the system 100 related to data visualized on the user interface screen 101. For example, in addition to receiving a visualization of image registration data in real-time on the user interface screen 101, the operator can configure the system 100 to provide summarized statistics of image registration information. Thus, image registration statistics can be provided for a current print job or part of a current print job (i.e., statistics for a specified number of pages), for a previous print job or print jobs, and so on, during a print job, at the end of a print job, for previous jobs, and in various other user-configurable ways. Other examples of features that module 109 can enable include enabling the operator to adjust limits on acceptable image registration ranges (e.g., ranges that are tighter or looser that the manufacturer's specification), add an alert that is activated when a registration range is exceeded, disqualify and remove a printed page that falls outside of an acceptable image registration range, list the identification and/or number of a disqualified page so it can be manually removed, include a trend analysis to tell the operator if images are becoming more or less aligned during a print job, reset the point at which image registration data begins being measured, and so on.

Figure 5:
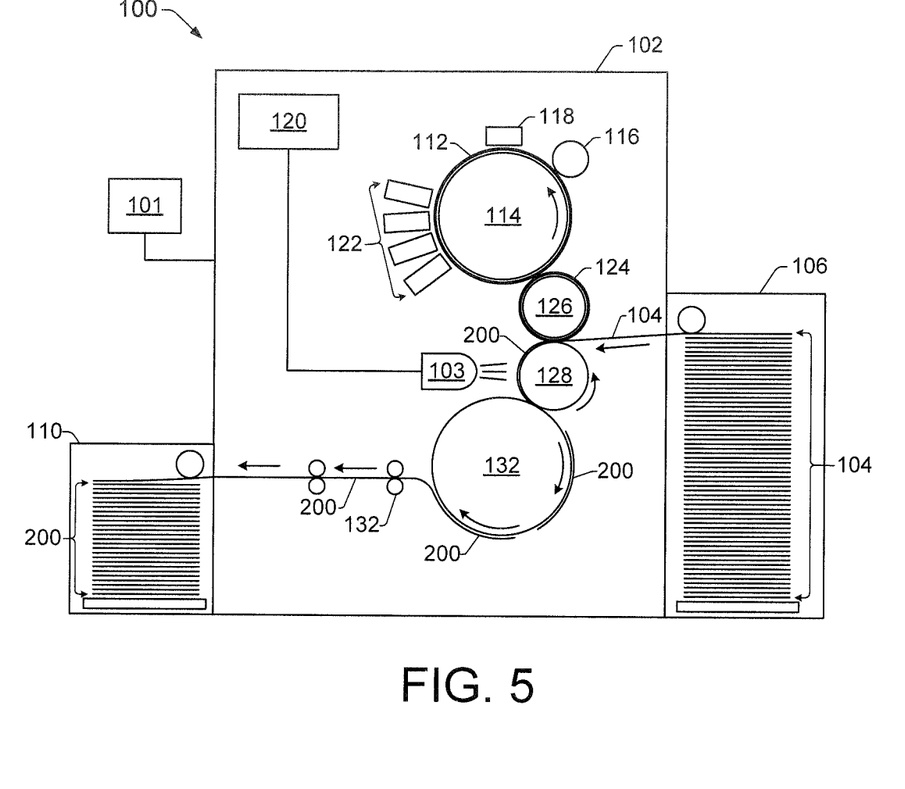
FIG. 5 shows an example of a system implemented as a digital LEP printing press suitable for enabling image registration through the visualization of measured image registration digital data information.

As noted above, in some examples, system 100 comprises a print-on-demand, digital printing device, such as a liquid electrophotographic (LEP) digital printing press 100. FIG. 5 shows an example of a system 100 implemented as a digital LEP printing press 100 suitable for enabling image registration through the visualization of measured image registration digital data information. A LEP digital printing press 100 generally includes a user interface 101 that enables the press operator to manage various aspects of printing, such as loading and reviewing print jobs, proofing and color matching print jobs, reviewing the order of the print jobs, and so on. The user interface 101 typically includes a touch-sensitive display screen that allows the operator to interact with information on the screen, make entries on the screen, and generally control the press 100. In some examples, the user interface screen 101 displays graphic and/or diagrammatic visualizations of image registration data measured by an imaging device 103 from registration targets on a printed page. The user interface 101 may also include other devices such as a key pad, a keyboard, a mouse, and a joystick, for example.

The LEP digital printing press 100 includes a print engine 102 that receives a print substrate, illustrated as print media 104 (e.g., cut-sheet paper or a paper web) from a media input mechanism 106. After the printing process is complete, the print engine 102 outputs the printed media pages 200 to a media output mechanism, such as a media stacker tray 110. The printing process is generally controlled by a print controller 120 to generate the printed pages 200 using digital image data that represents words, pages, text, and images that can be created, for example, using electronic layout and/or desktop publishing programs. Digital image data is generally formatted as one or multiple print jobs that are stored and executed on the print controller 120, as further discussed below with reference to FIG. 6.

The print engine 102 includes a photo imaging component, such as a photoreceptor 112 mounted on an imaging drum 114 or imaging cylinder 114. The photoreceptor 112 defines an outer surface of the imaging drum 114 on which images can be formed. A charging component such as charge roller 116 generates electrical charge that flows toward the photoreceptor surface and covers it with a uniform electrostatic charge. The print controller 120 uses digital image print data and other inputs such as print job and print media parameters, temperatures, and so on, to control a laser imaging unit 118 to selectively expose the photoreceptor 112. The laser imaging unit 118 exposes image areas on the photoreceptor 112 by dissipating (neutralizing) the charge in those areas. Exposure of the photoreceptor in this manner creates a 'latent image' in the form of an invisible electrostatic charge pattern that replicates the image to be printed.

After the latent/electrostatic image is formed on the photoreceptor 112, the image is developed by a binary ink development (BID) roller 122 to form an ink image on the outer surface of the photoreceptor 112. Each BID roller 122 develops one ink color of the image, and each developed color corresponds with one image impression. While four BID rollers 122 are shown, indicating a four color process (i.e., a CMYK process), other press implementations may include additional BID rollers 122 corresponding to additional colors. In addition, although not illustrated, print engine 102 also includes an erase mechanism and a cleaning mechanism which are generally incorporated as part of any electrophotographic process.

In a first image transfer, the single color separation impression of the ink image developed on the photoreceptor 112 is transferred from the photoreceptor 112 to an image transfer blanket 124. The image transfer blanket 124 is primarily referred to herein as the print blanket 124 or blanket 124. The print blanket 124 overlies and is securely fastened to the outer surface of the intermediate transfer media (ITM) drum 126, sometimes referred to as the image transfer drum 126. The first image transfer that transfers ink from the photoreceptor 112 to the print blanket 124 is driven by electrophoresis of the electrically charged ink particles and an applied mechanical pressure between the imaging drum 114 and the ITM drum 126. The blanket 124 is electrically conductive, enabling it to be electrified by an applied bias voltage. The electric field that drives the ink transfer is created by the applied bias voltage.

The print blanket 124 can be heated by internal and external heating sources such as infrared heating lamps (not shown). Heat from the heated print blanket 124 causes most of the carrier liquid and solvents in the transferred ink image to evaporate. The blanket heat also causes the particles in the ink to partially melt and blend together. This results in a finished ink image on the blanket 124 in the form of a hot, nearly dry, tacky plastic ink film. In a second image transfer, this hot ink film image impression is then transferred to a substrate such as a sheet of print media 104, which is held by an impression drum/cylinder 128. The temperature of the print media substrate 104 is below the melting temperature of the ink particles, and as the ink film comes into contact with the print media substrate 104, the ink film solidifies, sticks to the substrate, and completely peels off from the blanket 124, forming a printed page 200 on the impression drum 128.

This process is repeated for each color separation in the image, and the print media 104 remains on the impression drum 128 until all the color separation impressions (e.g., C, M, Y, and K) in the image are transferred to the print media 104. After all the color impressions have been transferred to the sheet of print media 104, the printed media page 200 is transported by various rollers 132 from the impression drum 128 to the output mechanism 110.

As mentioned above, the LEP digital printing press 100 includes an imaging device 103 to image a printed page 200 as it is transported over an imaging drum 128 along a print media path within the printing press 100. Imaging device 103 can comprise a scanner, a camera, or other imager, implementing various image sensors such as CCD's (charge coupled devices), CMOS devices, and so on. A light source (not shown) may accompany the imaging device 103 to provide illumination for reflecting off the printed page 200.

Figure 6:
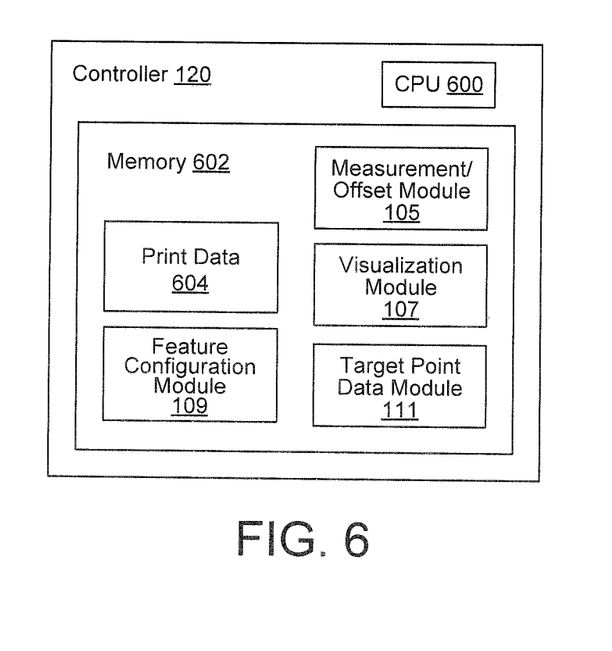
FIG. 6 shows a box diagram of an example controller suitable for implementing within an LEP digital printing press to control a printing process and image registration process.

FIG. 6 shows a box diagram of an example controller 120 suitable for implementing within an LEP digital printing press 102 to control a printing process and image registration process as described herein. Referring generally to FIGS. 5 and 6, print controller 120 generally comprises a processor (CPU) 600 and a memory 602, and may additionally include firmware and other electronics for communicating with and controlling the other components of print engine 102, the user interface 101, and media input (106) and output (110) mechanisms. Memory 602 can include both volatile (i.e., RAM) and nonvolatile (e.g., ROM, hard disk, optical disc, CD-ROM, magnetic tape, flash memory, etc.) memory components. The components of memory 602 comprise non-transitory, machine-readable (e.g., computer/processor-readable) media that provide for the storage of machine-readable coded program instructions, data structures, program instruction modules, JDF (job definition format), and other data for the printing press 100, such as modules 105, 107, 109, and 111. The program instructions, data structures, and modules stored in memory 602 may be part of an installation package that can be executed by processor 600 to implement various examples, such as examples discussed herein. Thus, memory 602 may be a portable medium such as a CD, DVD, or flash drive, or a memory maintained by a server from which the installation package can be downloaded and installed. In another example, the program instructions, data structures, and modules stored in memory 602 may be part of an application or applications already installed, in which case memory 602 may include integrated memory such as a hard drive.

As noted above, controller 120 uses digital image data to control the laser imaging unit 118 in the print engine 102 to selectively expose the photoconductor 112. More specifically, controller 120 receives print data 604 from a host system, such as a computer, and stores the data 604 in memory 602. Data 604 represents, for example, documents or image files to be printed. As such, data 604 forms one or more print jobs for printing press 102 that each include print job commands and/or command parameters. Using a print job from data 604, print controller 120 controls components of print engine 102 (e.g., laser imaging unit 118) to form characters, symbols, and/or other graphics or images on print media 104 through a printing process as has been generally described above with reference to FIG. 2. In examples described herein, controller 120 also uses data from the registration target point data module 111 stored in memory 602 to form registration target points (e.g., target points 202, FIG. 2) onto print media pages 104.

In addition to controlling the printing function, controller 120 executes instructions from various modules 105, 107, and 109, to perform functions related to the registration of images on printed pages. For example, controller 120 executes instructions from measurement/offset module 105 to control imaging device 103 for imaging printed pages, such as printed page 200 of FIG. 2. Executing instructions from module 105, controller 120 also performs measurements and analysis of the targets points 202 on pages 200 to provide real-time image registration digital data based on measured registration target points, as has been described above with reference. Furthermore, controller 120 executes instructions from the visualization module 107 to control the analysis and transformation of the real-time image registration digital data into a diagrammatic or graphical visualization that can be displayed on the user interface screen 101 of the digital printing press 100, such as the visualization shown in FIG. 3. These functions controlled by controller 120 are similar to or the same as have been described above with regard to the system 100 of FIG. 1.

Figure 7:
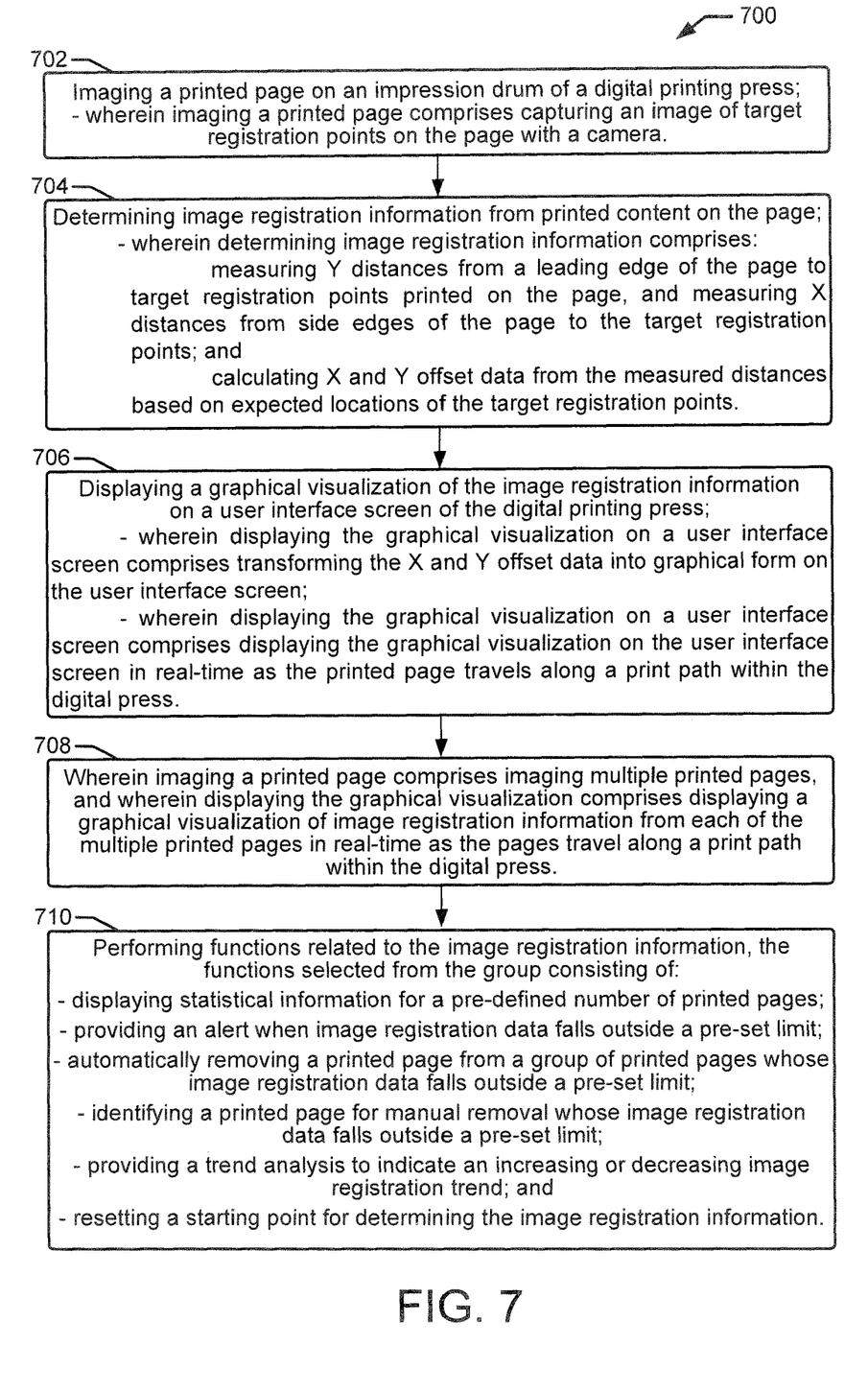
FIGS. 7 and 8 show flow diagrams of example methods related to providing a visual indication of image registration data in a printing system such as an LEP digital printing press.
Figure 8:
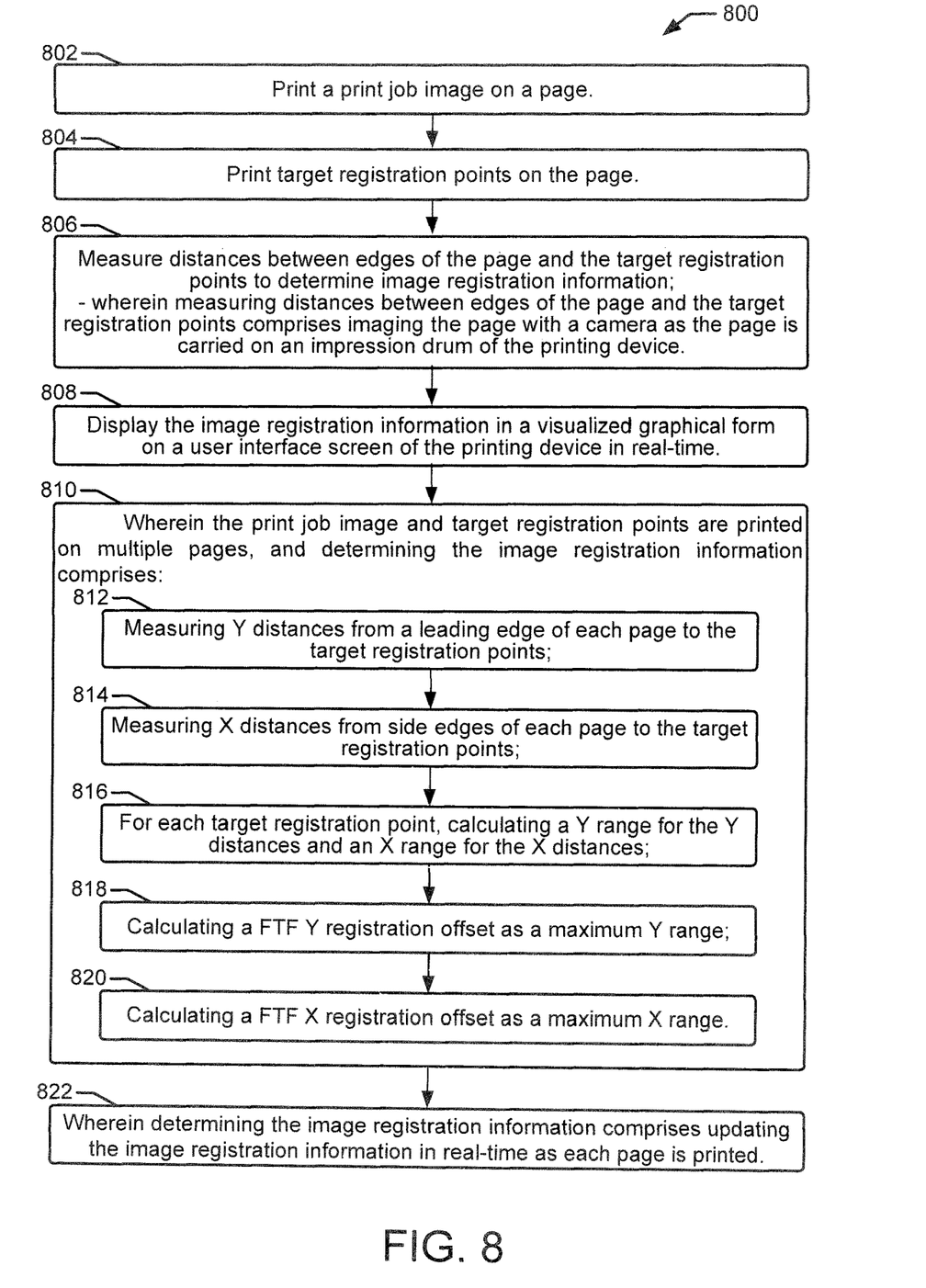

FIGS. 7 and 8 show flow diagrams that illustrate example methods 700 and 800, related to providing a visual indication of image registration data in a printing system such as an LEP digital printing press. Methods 700 and 800 are associated with the examples discussed above with regard to FIGS. 1-6, and details of the operations shown in methods 700 and 800 can be found in the related discussion of such examples. The operations of methods 700 and 800 may be embodied as programming instructions stored on a non-transitory, machine-readable (e.g., computer/processor-readable) medium, such as memory 602 as shown in FIG. 6. In some examples, implementing the operations of methods 700 and 800 can be achieved by a processor, such as a processor 600 of FIG. 6, reading and executing the programming instructions stored in a memory 602. In some examples, implementing the operations of methods 700 and 800 can be achieved using an ASIC (application specific integrated circuit) and/or other hardware components alone or in combination with programming instructions executable by processor 600.

Methods 700 and 800 may include more than one implementation, and different implementations of methods 700 and 800 may not employ every operation presented in the respective flow diagrams. Therefore, while the operations of methods 700 and 800 are presented in a particular order within the flow diagrams, the order of their presentation is not intended to be a limitation as to the order in which the operations may actually be implemented, or as to whether all of the operations may be implemented. For example, one implementation of method 700 might be achieved through the performance of a number of initial operations, without performing one or more subsequent operations, while another implementation of method 700 might be achieved through the performance of all of the operations.

Referring now to the flow diagram of FIG. 7, an example method 700 of providing image registration information in a digital printing press begins at block 702, with imaging a printed page on an impression drum of a digital printing press. In some examples, imaging a printed page comprises capturing an image of target registration points on the page with a camera. As shown at block 704, the method can continue with determining image registration information from printed content on the page. In some examples, determining image registration information comprises measuring Y distances from a leading edge of the page to target registration points printed on the page, and measuring X distances from side edges of the page to the target registration points. Determining the image registration information may also comprise calculating X and Y offset data from the measured distances based on expected locations of the target registration points. As shown at block 706, the method can include displaying a graphical visualization of the image registration information on a user interface screen of the digital printing press. In some examples, displaying the graphical visualization on a user interface screen comprises transforming the X and Y offset data into graphical form on the user interface screen. In some examples, displaying the graphical visualization on a user interface screen comprises displaying the graphical visualization on the user interface screen in real-time as the printed page travels along a print path within the digital press.

Continuing at block 708 of method 700, imaging a printed page can comprise imaging multiple printed pages. In such examples, displaying the graphical visualization can comprise displaying a graphical visualization of image registration information from each of the multiple printed pages in real-time as the pages travel along a print path within the digital press. As shown at block 710, the method can include performing other functions related to the image registration information. Such functions can include, for example, displaying statistical information for a pre-defined number of printed pages, providing an alert when image registration data falls outside a pre-set limit, automatically removing a printed page from a group of printed pages whose image registration data falls outside a pre-set limit, identifying a printed page for manual removal whose image registration data falls outside a pre-set limit, providing a trend analysis to indicate an increasing or decreasing image registration trend, and resetting a starting point for determining the image registration information.

Referring now to the flow diagram of FIG. 8, an example method 800 related to providing a visual indication of image registration data in a digital printing press begins at blocks 802 and 804 with printing a print job image and target registration points on a page. At block 806, the method continues with measuring distances between edges of the page and the target registration points to determine image registration information. In some examples, measuring distances between edges of the page and the target registration points comprises imaging the page with a camera as the page is carried on an impression drum of the printing device. As shown at block 808, the method continues with displaying the image registration information in a visualized graphical form on a user interface screen of the printing device in real-time.

As shown at block 810, where the print job image and target registration points are printed on multiple pages, determining the image registration information can comprise measuring Y distances from a leading edge of each page to the target registration points (812), measuring X distances from side edges of each page to the target registration points (814), calculating a Y range for the Y distances and an X range for the X distances for each target registration point (816), calculating a FTF Y registration offset as a maximum Y range (818), and calculating a FTF X registration offset as a maximum X range (820). In some examples, as shown at block 822, determining the image registration information can comprise updating the image registration information in real-time as each page is being printed.

What is claimed is:

1. A printing method for a digital printing press, the method comprising:
    printing a print job image on a page including transferring each of multiple individual color separations successively from an intermediate transfer member to the page while the page is held on an impression drum;
    printing target registration points on the page together with the print job image;
    capturing an image of the printed page while the printed page is still on the impression drum;
    determining image edge registration information from the captured image by measuring a distance between target registration points printed on the printed page and an edge of the printed page;
    displaying a graphical visualization of the image edge registration information on a user interface screen of the digital printing press; and
    making press adjustments to overcome an edge registration error shown in the displayed visualization.

2. A method as in claim 1, wherein capturing an image of the printed page comprises capturing an image of the target registration points on the page with a camera.

3. A method as in claim 2, wherein determining image edge registration information comprises:
    measuring Y distances from a leading edge of the printed page to one or more of the target registration points printed on the page, and X distances from side edges of the printed page to one or more of the target registration points; and
    calculating X and Y offset data from the measured distances based on expected locations of the target registration points.

4. A method as in claim 3, wherein displaying the graphical visualization on a user interface screen comprises transforming the X and Y offset data into graphical form on the user interface screen.

5. A method as in claim 1, wherein displaying the graphical visualization on a user interface screen comprises displaying the graphical visualization on the user interface screen in real-time as the printed page travels along a print path within the digital press.

6. A method as in claim 5, wherein capturing an image of the printed page comprises capturing an image of each of multiple printed pages while each printed page is on the impression drum, and wherein displaying the graphical visualization comprises displaying a graphical visualization of image edge registration information from each of the multiple printed pages in real-time as each page travels along a print path within the digital press.

7. A method as in claim 1, further comprising performing functions related to the image edge registration information, the functions selected from the group consisting of displaying statistical information for a pre-defined number of printed pages, providing an alert when image edge registration data falls outside a pre-set limit, automatically removing a printed page from a group of printed pages whose image edge registration data falls outside a pre-set limit, identifying a printed page for manual removal whose image edge registration data falls outside a pre-set limit, providing a trend analysis to indicate an increasing or decreasing image registration trend, and resetting a starting point for determining the image edge registration information.

8. A liquid electrophotographic digital printing press comprising:
    a user interface screen;
    a print engine including a photo imaging component to hold a single color separation of an ink image, an intermediate transfer drum to receive the single color separation from the photo imaging component, and an impression drum to hold a sheet of print media to receive each of multiple individual color separations successively from the intermediate transfer drum to form the ink image on the sheet as a printed page;
    an imaging device to capture an image of each of multiple printed pages while each printed page is on the impression drum;
    a controller operatively connected to the user interface screen, the print engine and the imaging device to cause the print engine to print each page and to cause the imaging device to capture an image of each of the printed pages, the controller including a measurement module to measure from the images captured by the imaging device a misregistration of the ink image on one or more of the printed pages with respect to an edge of the printed page and a visualization module to cause the user interface screen to display the edge misregistration in graphical form.

9. A digital printing press as in claim 8, wherein the measurement module is to measure edge misregistration by measuring a distance between an edge of the print page and a target registration point printed next to the ink image.

10. A digital printing press as in claim 9, wherein the measurement module is to measure edge misregistration by measuring a distance between a leading edge of the printed page and a target registration point printed next to the ink image in the same printing operation and between a side edge of the printed page and the target registration point.

11. A digital printing press as in claim 10, wherein the target point includes multiple target points printed adjacent to a leading edge and a trailing edge of the printed page.

12. A non-transitory machine-readable storage medium storing instructions that when executed by a processor of a printing device, cause the printing device to:
    print a print job image on a page including to transfer each of multiple individual color separations successively from an intermediate transfer member to the page while the page is held on an impression drum;
    print target registration points on the page together with the print job image;
    measure distances between edges of the page and the target registration points to determine image edge registration information;
    display the image registration information in a visualized graphical form on a user interface screen of the printing device in real-time.

13. A medium as in claim 12, wherein measuring distances between edges of the page and the target registration points comprises capturing an image of the page with a camera as the page is carried on an impression drum of the printing device.

14. A medium as in claim 12, wherein the print job image and target registration points are printed on multiple pages, and determining the image edge registration information comprises:
- measuring Y distances from a leading edge of each page to one or more of the target registration points;
- measuring X distances from side edges of each page to one or more of the target registration points;
- for each target registration point, calculating a Y range for the Y distances and an X range for the X distances;
- calculating a front-to-front Y registration offset as a maximum Y range; and
- calculating a front-to-front X registration offset as a maximum X range.

15. A medium as in claim 12, wherein determining the image edge registration information comprises updating the image edge registration information in real-time as each page is printed.

\* \* \* \* \*